(12) United States Patent
Hartmann

(10) Patent No.: US 12,000,490 B2
(45) Date of Patent: Jun. 4, 2024

(54) GAP SEAL DEVICE

(71) Applicant: HAMMELMANN GMBH, Oelde (DE)

(72) Inventor: Felix Hartmann, Oelde (DE)

(73) Assignee: Hammelmann GmbH, Oelde (DE)

( * ) Notice: Subject to any disclaimer, the term of this patent is extended or adjusted under 35 U.S.C. 154(b) by 0 days.

(21) Appl. No.: 18/019,880

(22) PCT Filed: Jul. 22, 2021

(86) PCT No.: PCT/EP2021/070517
§ 371 (c)(1),
(2) Date: Feb. 6, 2023

(87) PCT Pub. No.: WO2022/028906
PCT Pub. Date: Feb. 10, 2022

(65) Prior Publication Data
US 2023/0287980 A1    Sep. 14, 2023

(30) Foreign Application Priority Data
Aug. 7, 2020   (DE) .................... 10 2020 120 929.0

(51) Int. Cl.
*F16J 15/44*    (2006.01)
*F04B 53/14*    (2006.01)
*F16J 1/00*    (2006.01)

(52) U.S. Cl.
CPC .......... *F16J 15/445* (2013.01); *F04B 53/143* (2013.01); *F16J 1/005* (2013.01)

(58) Field of Classification Search
CPC ........ F16J 15/445; F16J 1/005; F04B 53/143; F04B 53/14; F04B 53/00; F02M 59/44
See application file for complete search history.

(56) References Cited

U.S. PATENT DOCUMENTS 2,574,109 A   11/1951  Kane et al.
4,102,611 A   7/1978   Broker
(Continued)

FOREIGN PATENT DOCUMENTS

DE         2615530 A1    10/1977
DE    102008041176 A1    2/2010
(Continued)

OTHER PUBLICATIONS

Citation of Office Action dated Mar. 25, 2021 in related/corresponding DE Application No. 10 2020 120 929.0.
(Continued)

*Primary Examiner* — Grant Moubry
(74) *Attorney, Agent, or Firm* — PATENT PORTFOLIO BUILDERS PLLC

(57) ABSTRACT

A gap seal device includes a housing with a fluid-filled guiding chamber and a multi-part piston that is translationally and/or rotationally moveable in the guiding chamber. The piston separates a high-pressure region from a low-pressure region of the guiding chamber. The piston forms an annular gap having a nominal gap width with an inner wall delimiting the guiding chamber. The piston has a stepped rod, a sleeve, which is slipped over a stepped-down region of the rod and which has a blind hole, and a coupling. The stepped-down region of the rod or in a tube portion of the sleeve includes a stiffness change. A gap width of the annular gap that is reduced compared with the nominal gap width can be set in a region radial to the stiffness change by stress-caused expansion of an outside diameter of the tube portion of the sleeve in accordance with the set stressing force.

13 Claims, 7 Drawing Sheets

(56) References Cited

Figure 1:
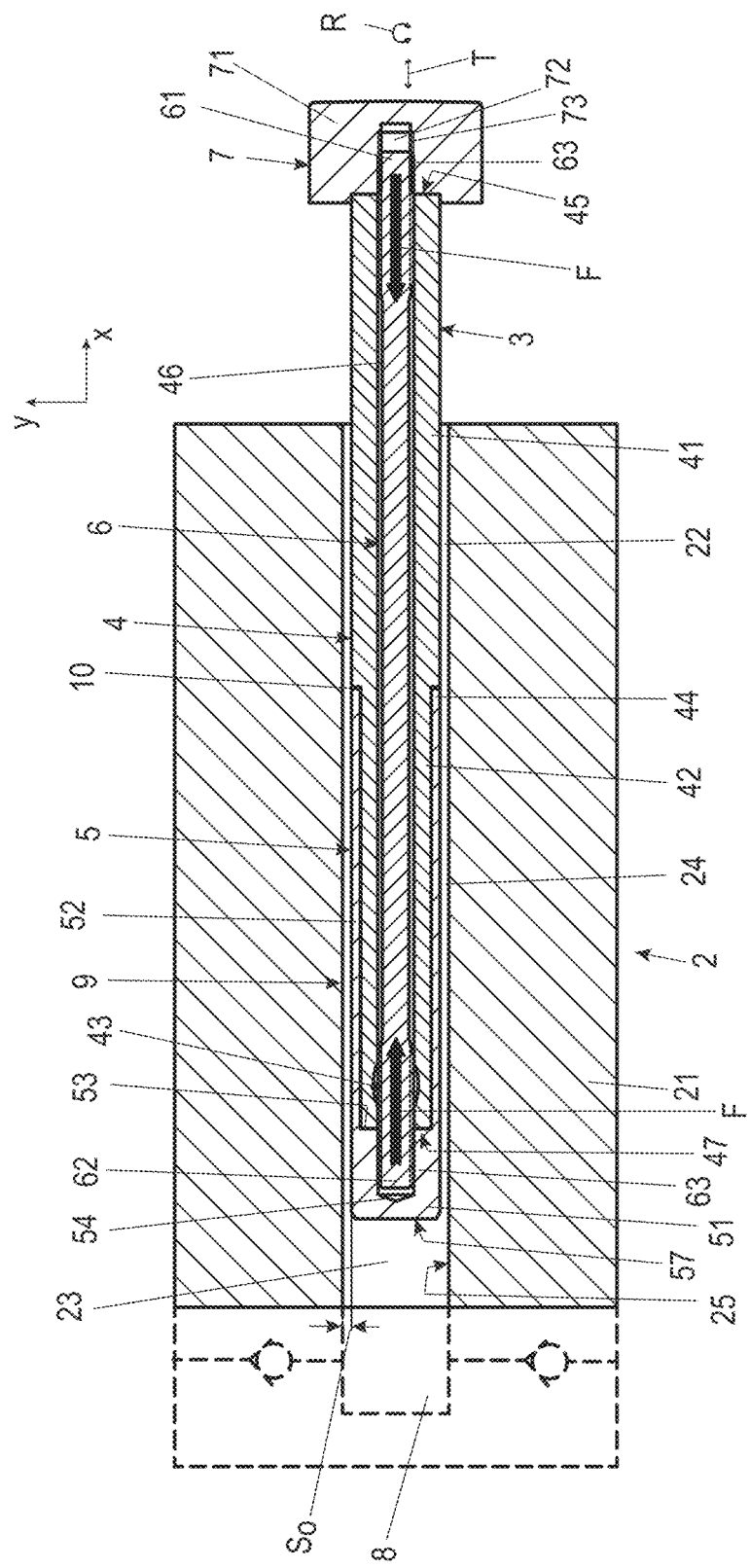

U.S. PATENT DOCUMENTS 4,734,013 A * 3/1988 Valavaara ............. F04B 9/1115
                                                                           417/387
5,740,718 A * 4/1998 Rathweg ............... F04B 53/164
                                                                           92/255

FOREIGN PATENT DOCUMENTS

| EP | 1353096 B1 | 9/2004 | |
|---|---|---|---|
| GB | 1462145 A | 1/1977 | |
| WO | WO-03076807 A1 * | 9/2003 | ........... F02M 59/442 |

OTHER PUBLICATIONS

International Search Report and Written Opinion dated Nov. 18, 2021 in related/corresponding International Application No. PCT/EP2021/070517.

* cited by examiner

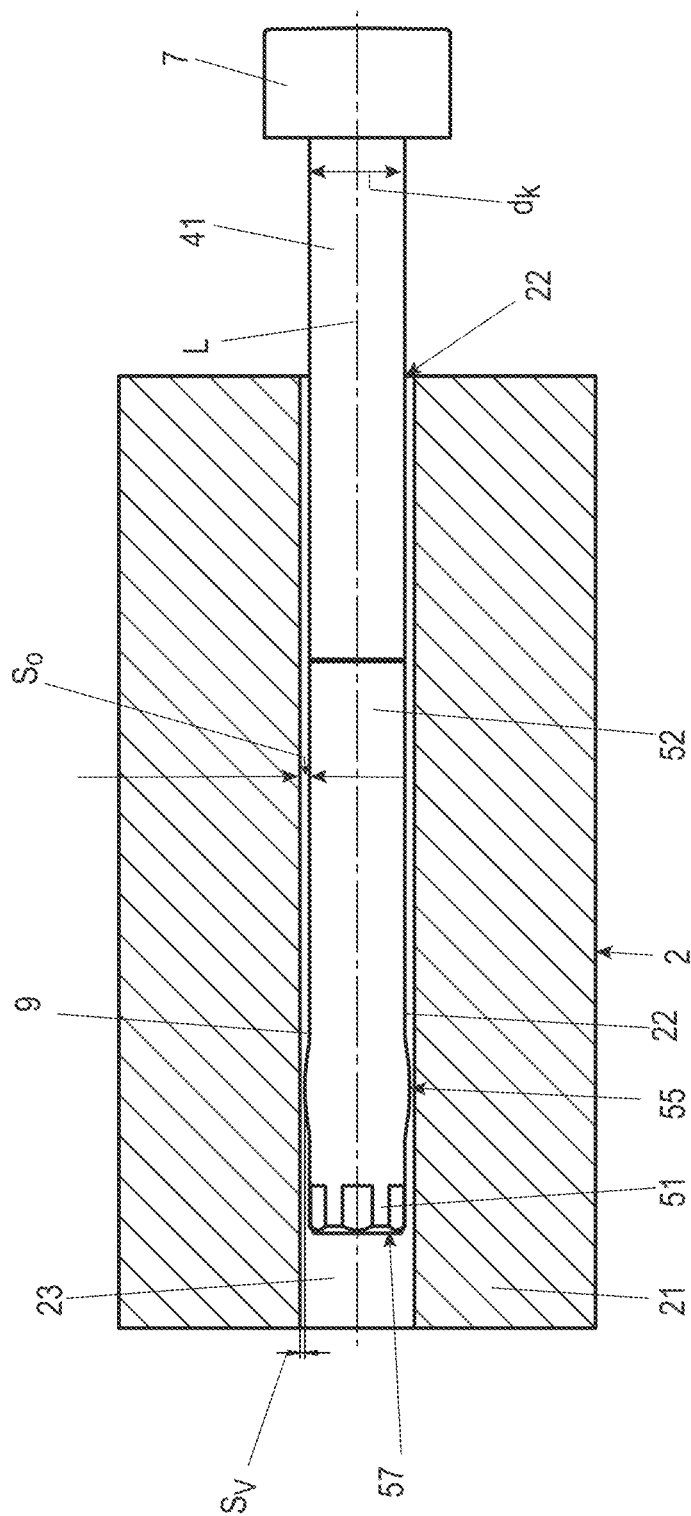

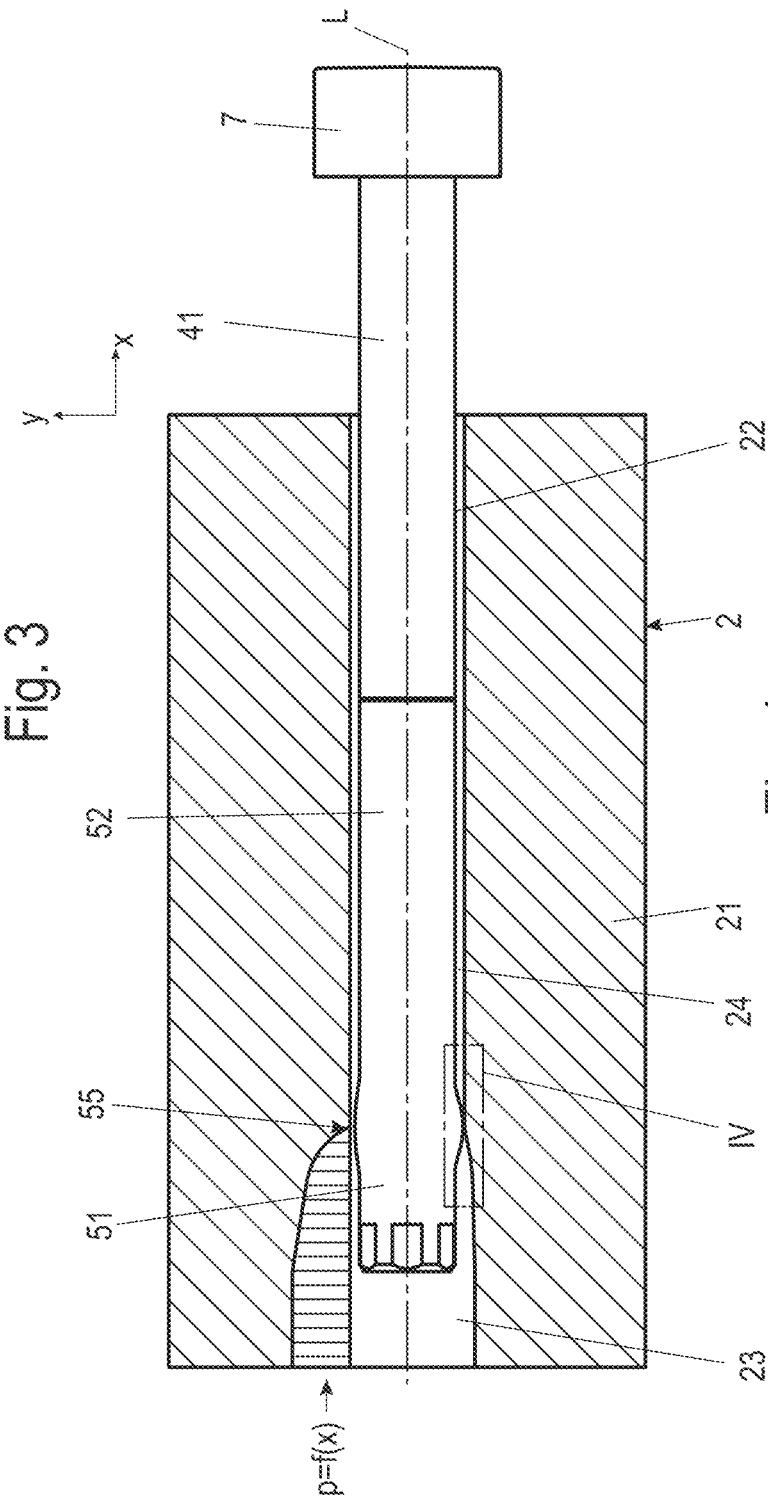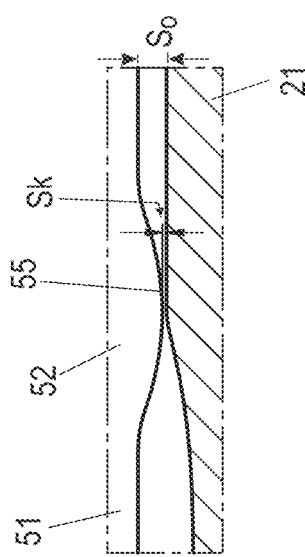

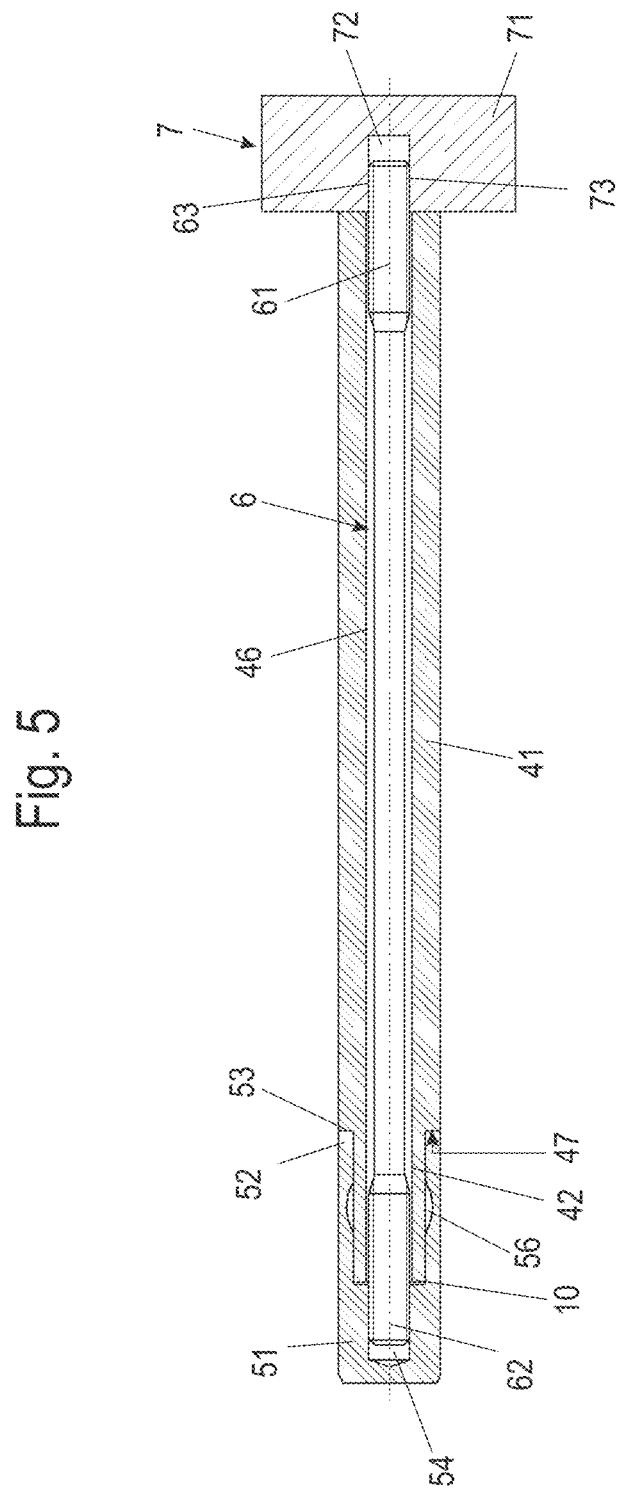

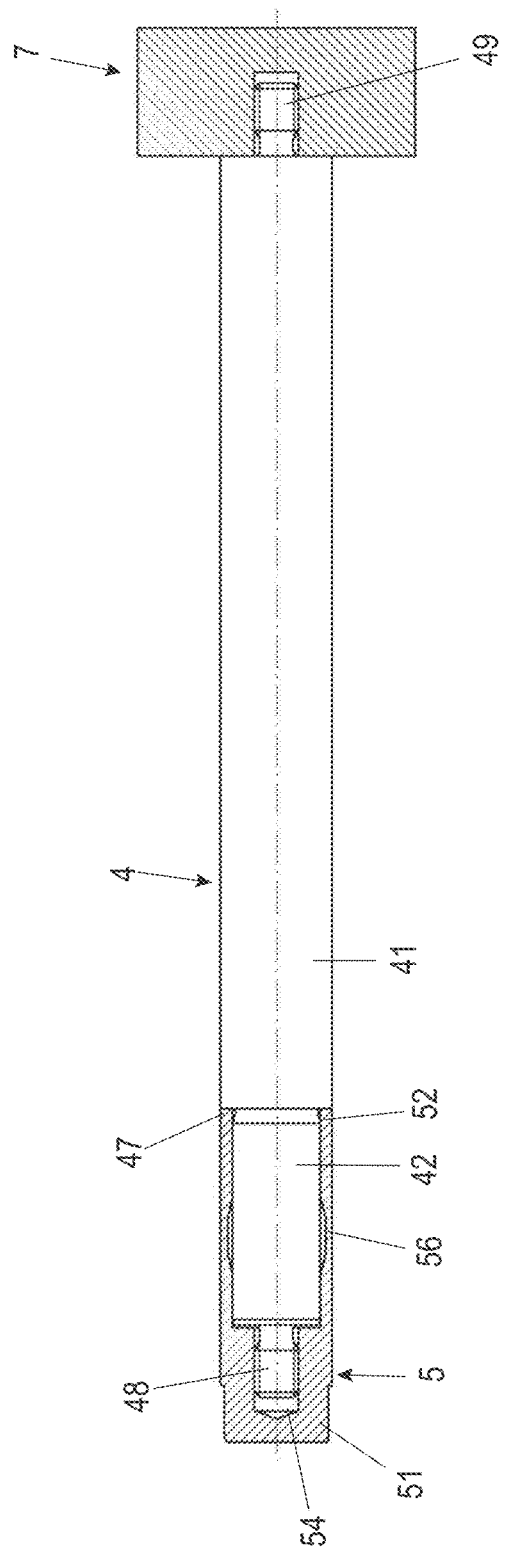

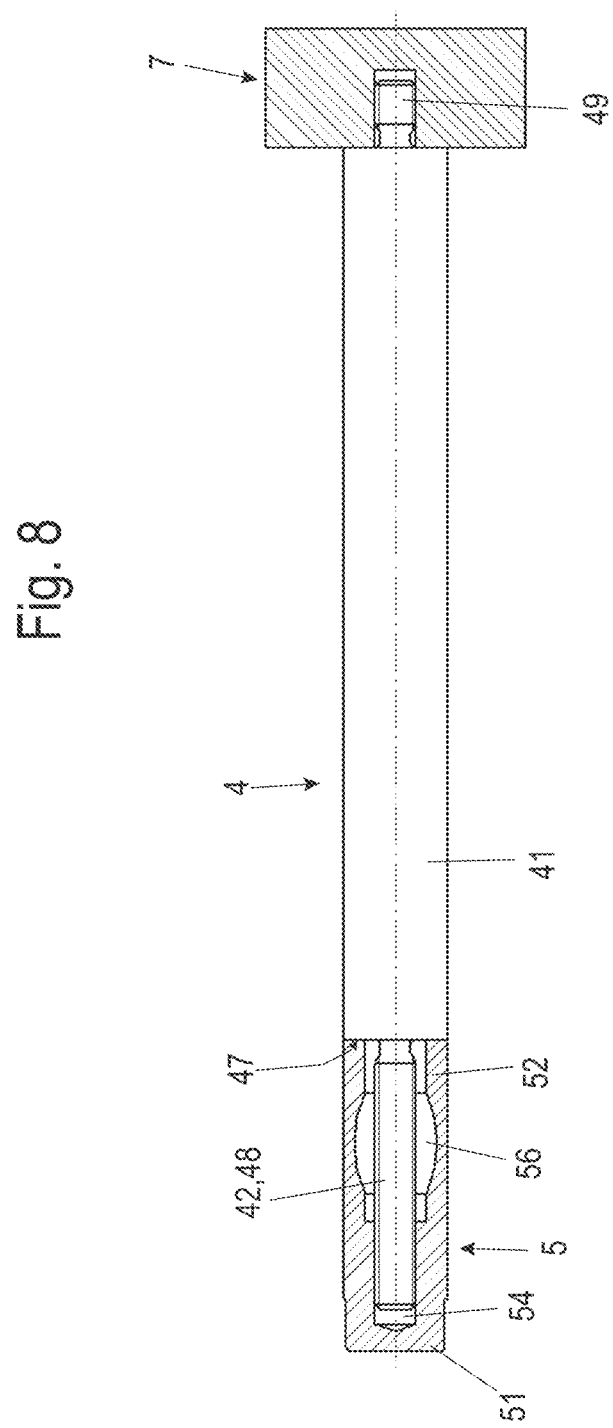

GAP SEAL DEVICE

BACKGROUND AND SUMMARY OF THE INVENTION

Exemplary embodiments of the present invention relate to a gap seal device.

A generic gap seal device is known, for example, from EP 1 353 096 B1.

In this publication, a sealing ring is used to seal a moving shaft or rod in the transition region between a high-pressure region and a low-pressure region of a guiding chamber of a housing that guides the rod. The sealing ring encloses the shaft or rod and is partially deformed by the high pressure applied in the high-pressure region with the aid of a press ring, so that the deformation of the sealing ring reduces the gap between the sealing ring and the shaft to such an extent that the latter only allows the desired leakage quantity of fluid to pass through.

Such a gap seal device has proven itself in practice.

Exemplary embodiments of the present invention provide a gap seal device that does not require such a sealing ring or a press ring, while still keeping manufacturing costs low.

The gap seal device according to the invention has a housing with a fluid-filled guiding chamber and a multi-part piston that can be moved translationally and/or rotationally in the guiding chamber.

The piston delimits a high-pressure region from a low-pressure region of the guiding chamber by forming an annular gap with a nominal gap width with an inner wall of the housing delimiting the guiding chamber.

The piston has a stepped rod, a sleeve with a blind hole fitted over a stepped-down region of the rod, and a coupling.

The rod can be stressed via the coupling and the sleeve.

The tube portion of the sleeve or the rod in its stepped-down region exhibits at least one stiffness change, in particular in the form of a weakening of the material.

A reduced gap width of the annular gap compared with the nominal gap width can be adjusted in a range radial to the stiffness change by stress-induced widening of an outer diameter of the tube portion of the sleeve as a function of the set stressing force.

With a gap seal device of this type, the gap dimension of the annular gap for sealing the high-pressure region from the low-pressure region of the guiding chamber can be adjusted in a simple manner by varying the tensioning of the rod or the sleeve, whereby the sealing effect of the gap seal device or the amount of leakage can be varied in a simple manner.

The rod can preferably be stressed relative to the sleeve for expanding an outer diameter of the sleeve tube portion.

According to a first preferred further development, the rod can be stressed via the coupling and the sleeve.

According to an advantageous embodiment variant, the rod is designed for this purpose as a hollow rod with a through hole in which a pull rod is accommodated, wherein the pull rod is guided through the through hole of the hollow rod and the hollow rod can be stressed by coupling a first end of the pull rod to the coupling and a second end of the pull rod to the sleeve.

The design of the rod as a hollow rod with a pull rod accommodated therein makes it possible to stress the rod or the sleeve in a simple manner.

According to an advantageous further development, the coupling has a blind hole provided with an internal thread, wherein an external thread at the first end of the pull rod is screwed onto the internal thread and a stressing force acting in the axial direction is applied to the hollow rod by rotation about a longitudinal axis of the pull rod.

This makes it easy to adjust the pressure on the hollow rod and thus the size of the annular gap by turning the coupling.

According to another embodiment variant, the stiffness change is formed as a material recess on the inner circumference of the stepped portion of the hollow rod.

Such a material recess can be made in the hollow rod in a simple manner.

In an alternative embodiment, the rod is designed as a stepped solid rod.

In particular, the rod can also be formed in one piece with the coupling.

Stressing of the rod relative to the sleeve is also possible with such an embodiment variant.

For stressing, in a preferred embodiment variant the rod has a first end provided with an external thread, which is screwed into an internal thread of the sleeve.

For stressing with a coupling designed as a separate component, the rod preferably has a second end provided with an external thread, which is screwed into an internal thread of the coupling.

According to an alternative embodiment variant, the stiffness change is formed as a material recess on the inner circumference of the tube portion of the sleeve.

This also allows the desired expansion of the outer diameter to be achieved in a simple manner.

The material recess is preferably designed as an annular recess and thus enables a circumferentially equal change in the outer diameter of the tube portion of the sleeve.

According to a further advantageous embodiment variant, the sleeve is axially adjustable relative to the pull rod with respect to the longitudinal axis of the pull rod.

This allows adjustment of the position of the outer diameter expansion of the tube portion of the sleeve in the axial direction of the pull rod.

BRIEF DESCRIPTION OF THE DRAWING FIGURES

Figure 6:
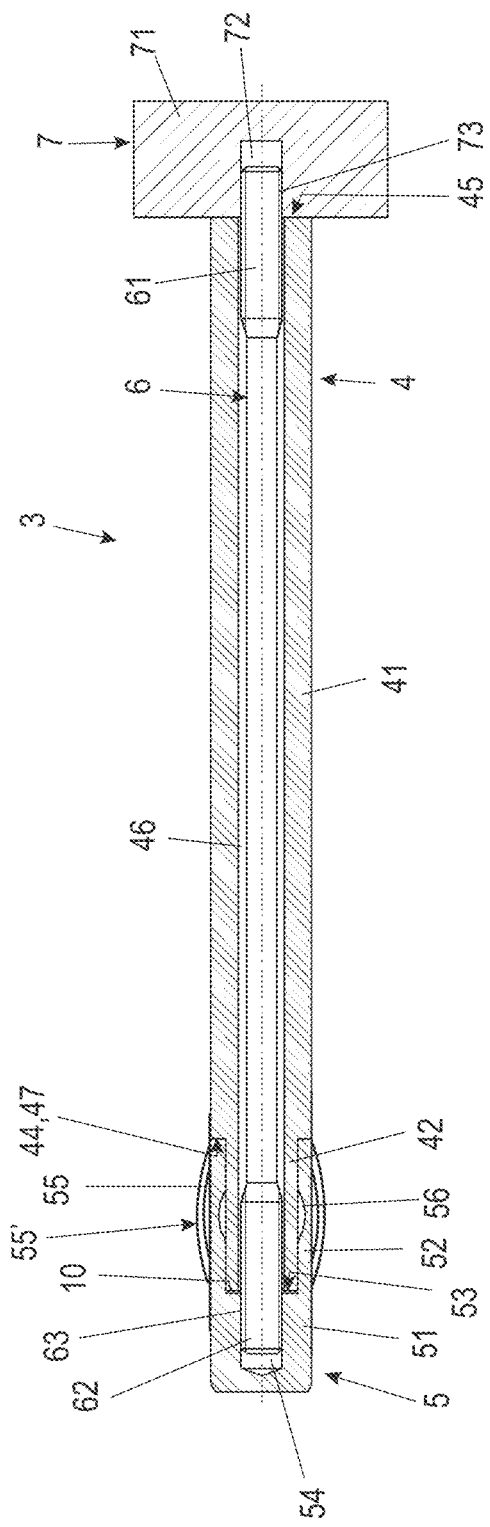

Preferred exemplary embodiments are explained in more detail below with reference to the accompanying drawings, wherein:

FIG. 1 shows a sectional view through an embodiment variant of a gap seal device according to the invention, FIG. 2 shows a partial sectional view of the gap seal device shown in FIG. 1 in the stressed state, FIG. 3 shows a representation of the gap seal device corresponding to FIG. 2, showing the pressure drop in front of the expanded region of the tube portion of the sleeve, FIG. 4 shows a detailed view of the portion marked IV in FIG. 3 under the additional deformation caused by the applied operating pressure, FIGS. 5 and 6 show corresponding to FIG. 1, an alternative embodiment variant of a gap seal device according to the invention with a stiffness change in the tube portion of the sleeve, and FIGS. 7 and 8 again show another alternative embodiment variant of a gap seal device according to the invention with a rod in the form of a solid rod.

DETAILED DESCRIPTION

In the following description of figures, terms such as top, bottom, left, right, front, rear, etc. refer exclusively to the exemplary representation and position of the gap seal device, housing, piston, rod, sleeve, coupling, pull rod and the like selected in the respective figures. These terms are not to be understood restrictively, i.e., different working positions or the mirror-symmetrical design or the like may cause these references to change.

In FIGS. 1 to 3, the reference sign 2 denotes a housing which has a fluid-filled guiding chamber 22 in which a multi-part piston 3 can be moved in translation and/or rotation.

The housing 2 can be designed as a component of an oscillating plunger pump, in which the piston performs an oscillating movement in the longitudinal direction L in a translation direction T into the guiding chamber 22, as shown in FIG. 1, in an operating cycle (suction and pressure stroke).

The piston 3 forms an annular gap 9 with an inner wall 25 bounding the guiding chamber 22 and separating a high-pressure region 23 of the guiding chamber 22 from a low-pressure region 24.

As shown in FIG. 1, the piston 3 is made up of several parts. The piston 3 has a stepped rod 4, here in the form of a hollow rod, with a through hole 46 and a sleeve 5 which is fitted over a stepped-down region 42 of the hollow rod 4.

The outer diameter of the sleeve 5 corresponds to the outer diameter $d_K$ of a guide region 41 of the rod 4, while the stepped-down region 42 of the rod 4 is dimensioned in its outer diameter so that it abuts against the inner wall of a tube portion 52 of the sleeve 5.

The sleeve 5 further has a blind hole 54 in the head portion 51 of the sleeve 5, which is used to receive a pull rod 6 that passes through the through hole 46 of the rod 4.

A first end 61 of this pull rod 6 is received in this case in a coupling 7, there in a blind hole 72. By coupling the first end 61 of the pull rod 6 with the coupling 7 and a second end 62 of the pull rod 6 with the sleeve 5, the hollow rod 4 can be stressed by bringing the coupling 7 closer to the sleeve 5.

As shown in the embodiment variant shown in FIG. 1, the rod 4, which is designed as a hollow rod, exhibits a stiffness change in its stepped-down region 42, in this case in the form of a material weakening 43.

In addition to the material weakening shown in the form of a targeted removal of material, a stiffness change can also be understood to mean, for example, a material section with a smaller modulus of elasticity.

In the alternative embodiment variant shown in FIGS. 5 and 6, the tube portion 52 of the sleeve 5 has such a stiffness change 56.

This stiffness change 43, 56 makes it possible for a width of the annular gap 9 in a region radial to the stiffness change 43, 56 of the hollow rod 4 to be adjustable from a nominal gap width $S_0$ to a gap width $S_V$ reduced compared with the nominal gap width $S_0$ as a function of the set stressing force F, as shown in FIG. 2.

Whereas in the embodiment variant shown in FIGS. 5 and 6, the tube portion 52 of the sleeve 5 is directly expanded by tightening the sleeve 5 relative to the coupling 7 in the region of the stiffness change 56, in the embodiment variant shown in FIGS. 1 to 3, the stepped-down region 42 of the hollow rod 4 provided with the stiffness change 43 presses radially outwardly against the tube portion 52 of the sleeve 5 as a result of the stressing force, which leads to the expansion of the outer diameter of the tube portion 52 of the sleeve 5 in this region.

According to a preferred embodiment variant, to produce the stressing of the hollow rod 4, the blind hole 72 of the coupling 7 is provided with an internal thread 73 and can thus be screwed onto an external thread 63 at the first end 61 of the pull rod 6.

By rotating the coupling head 71 of the coupling 7 in a direction of rotation R about a longitudinal axis L of the pull rod 6, the distance between the coupling head 71 and the sleeve 5 can thus be slightly reduced, resulting in a force acting in the axial direction on the hollow rod 4, which can be adjusted depending on the angle of rotation of the coupling head 7 covered and the pitch of the threads 63, 73.

The force acting on the hollow rod 4 in the axial direction causes the hollow rod 4 to deform.

The formation of the stiffness change 43 determines the location of this deformation as well as the direction of the deformation radially outward.

This deformation radially outward results in an expansion of the outer diameter of the tube portion 52 of the sleeve 5, as shown schematically in FIG. 2.

In the region of its second end 62, the pull rod 6 is preferably also provided with an external thread 63 onto which the sleeve 5 can be screwed. As a result, the sleeve 5 is also held on the pull rod 6 in the axial direction.

In this case, the transmission of the force exerted in the axial direction via the coupling 7 is effected by an inner end wall 53 on the head portion 51 of the sleeve 5, against which a pressure surface 47 of the stepped-down region 42 of the hollow rod 4 rests.

The end face of the tube portion 52 of the sleeve 5 is separated by a gap 10 from the step 44 of the hollow rod 4 at the transition from the guide region 41 to the stepped-down region 42.

The stiffness change 43 according to the embodiment variant shown in FIGS. 1 to 3 is preferably formed as a material recess on the inner circumference of the stepped-down region 42 of the hollow rod 4.

In the embodiment variant shown in FIGS. 5 and 6, the stiffness change 56 is preferably formed as a material recess on the inner circumference of the tube portion 52 of the sleeve 5.

The stiffness change 43, 56 formed as a material recess is preferably formed in this case as an annular recess.

It is also conceivable to make several changes in stiffness along the longitudinal axis L, as shown in FIG. 2, in order to distribute the sealing effect over several pressure reduction zones and to increase the guide portion of the piston 3.

According to a further embodiment variant, the sleeve 5 is axially adjustable relative to the pull rod 6 with respect to the longitudinal axis L of the pull rod 6.

The deformation 55 at the outer diameter of the tube portion 52 of the sleeve 5 is adjusted after setting the stressing force via the coupling 7 so that the gap width is reduced compared to a nominal gap width $S_0$ such that in the exemplary use of the gap seal device in an oscillating plunger pump, it is possible to fill the high-pressure region 23 with the fluid in the suction stroke and to perform compression in the pressure stroke.

During this pressure stroke, as shown in FIGS. 3 and 4, further deformation of the tube portion 52 of the sleeve 5 also occurs, due to the high pressure acting on the end face 57 of the sleeve 5, reducing the annular gap 9 to a further reduced gap width $S_K$ and thus further promoting sealing of the fluid in the compression space forming the high-pressure region 23 and further reducing leakage.

In FIG. 3, to illustrate the pressure reduction at the inner circumferential surface of the body 21 of the housing 2 bounding the guiding chamber 22, a pressure curve p is shown schematically, which is intended to represent the gradually decreasing high pressure p acting on the inner surface of the housing 2, which is dependent on the extension of the gap S in the longitudinal direction X according to a function p=f(x).

In principle, it is also conceivable to use such a gap seal device in rotating systems in which the piston 3 is moved rotationally in the housing 2 and a pressurized space, in this case the high-pressure region 23, must be sealed off from a low-pressure region 24.

In the embodiment variant shown in FIGS. 5 and 6, in which the stiffness change 56 is provided on the inner circumference of the tube portion 52 of the sleeve 5, the pressure surface 47 against which the stressing force exerted by the coupling 7 is applied is equal to the step 44 of the hollow rod 4 in the transition region between the guide region 41 and the stepped-down region 42.

Here, the end face of the stepped-down region 42 of the hollow rod 4 is spaced from the inner end wall 53 of the sleeve 5 by a gap 10.

FIG. 6 also shows two deformations 55, 55' of different sizes, where deformation 55 is generated by the stressing and deformation 55' is generated by the additional compression of the fluid under high pressure.

The pressure is preferably between 150 bar and 8000 bar, particularly preferably between 1500 bar and 6000 bar. In the low-pressure region 24, the fluid is preferably under a pressure of 1 to 16 bar.

Due to the high pressure in the high-pressure region 23, which extends into the guiding chamber 22 of the housing 2 via a high-pressure chamber 8, this pressure difference leads to a slight deformation also on the inside of the housing 2, as shown in FIG. 4.

Depending on the high pressure present, the deformation 55 in the tube portion 52 of the sleeve 5 can be so great that the width of the remaining sealing gap $S_K$ approaches zero, thus completely or almost completely preventing leakage of the fluid in the high-pressure state into the low-pressure region.

FIGS. 7 and 8 show two further, once again alternative embodiment variants of a gap seal device according to the invention, in this case with a solid rod or a massively designed rod, respectively.

In these variants, the rod 4 preferably has a first end 48 provided with an external thread, which is screwed into an internal thread of the sleeve 5.

Accordingly, the rod 4 also has a second end 49 provided with an external thread, which is screwed into the internal thread 73 of the coupling 7. Other coupling designs are also conceivable here, which allow the rod 4 to be stressed or tied in the axial direction L.

In this case, the two ends 48, 49 protrude from an end face of the guide region 1 of the rod 4 and have a smaller diameter than the diameter $d_K$ of the guide region 1.

In the embodiment variant shown in FIG. 7, an outer lateral surface of the stepped-down region 42 encased by the sleeve 5 abuts the inner surface of the tube portion 52 of the sleeve 5 except for the stiffness change 56 formed as a material recess.

This stepped-down region 42 is then adjoined by the first end 47 of the rod 4, which is screwed into the head portion 51 of the sleeve 5.

In the embodiment variant shown in FIG. 8, the stepped-down region 42 merges smoothly into the first end 47, so that the tube portion 52 of the sleeve 5, on the inner lateral surface of which the stiffness change 56 is formed, does not contact the outer lateral surface of the stepped-down region 42 encased by the sleeve 5.

It is also conceivable to design the rod as a single piece with the coupling.

It is also important in these embodiment variants that the stressing of the rod 4 allows an initial reduction in the width of the annular gap 9 from the nominal gap width $S_0$ to a stressed gap width $S_V$, which is further reduced to a gap width $S_K$ when pressure is applied.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

2 Housing
21 Body
22 Guiding chamber
23 High-pressure region
24 Low-pressure region
3 Rod
4 Rod
41 Guide region
42 Stepped-down region
43 Stiffness change
44 Step
45 First end face
46 Through hole
47 Pressure surface
48 First end
49 Second end
5 Sleeve
51 Head portion
52 Tube portion
53 Interior end wall
54 Blind hole
55 Deformation
56 Stiffness change
57 End face
6 Pull rod
61 First end
62 Second end
63 External thread
7 Coupling
71 Coupling head
72 Blind hole
73 Internal thread
8 High-pressure chamber
9 Annular gap
10 Gap
S Gap width
$S_0$ Nominal gap width
$S_V$ Gap width stressed $S_K$ Gap width stressed and with high pressure applied
L Longitudinal axis
T Translation direction
R Rotation direction
X Direction
Y Direction
$d_K$ Diameter
p Pressure

The invention claimed is:

1. A gap seal device, comprising:
a housing having a fluid-filled guiding chamber; and
a multi-part piston that is translationally or rotationally moveable in the fluid-filled guiding chamber,
wherein the multi-part piston separates a high-pressure region from a low-pressure region of the fluid-filled guiding chamber,
wherein the multi-part piston forms an annular gap having a nominal gap width with an inner wall delimiting the fluid-filled guiding chamber,
wherein the multi-part piston comprises a stepped rod, a sleeve, and a coupling,
wherein the sleeve is slipped over a stepped-down region of the stepped rod and the sleeve has a blind hole,
wherein the stepped-down region of the stepped rod or a tube portion of the sleeve has at least one stiffness change,
wherein a gap width of the annular gap that is reduced compared to the nominal gap width is settable in a region radial to the at least one stiffness change by stress-induced expansion of an outer diameter of the tube portion of the sleeve as a function of a set stressing force.

2. The gap seal device of claim 1, wherein the stepped rod is stressable relative to the sleeve.

3. The gap seal device of claim 1, wherein the stepped rod is stressable via the coupling and the sleeve.

4. The gap seal device of claim 3, wherein the stepped rod is a hollow rod with a through hole in which a pull rod is accommodated, wherein the pull rod is guided through the through hole of the stepped hollow rod and the stepped hollow rod is stressable by coupling a first end of the pull rod to the coupling and a second end of the pull rod to the sleeve.

5. The gap seal device of claim 4, wherein the coupling has a blind hole with an internal thread, wherein an external thread at the first end of the pull rod is screwed onto the internal thread and a pressure acting in an axial direction of the pull rod on the stepped hollow rod is settable by rotation about a longitudinal axis of the pull rod.

6. The gap seal device of claim 4, wherein the sleeve is axially adjustable relative to the pull rod with respect to a longitudinal axis of the pull rod.

7. The gap seal device of claim 1, wherein the at least one stiffness change is a material recess on the inner circumference of the stepped-down region of the stepped hollow rod.

8. The gap seal device of claim 7, wherein the material recess is an annular recess.

9. The gap seal device of claim 1, wherein the stepped rod is a stepped-down solid rod.

10. The gap seal device of claim 9, wherein the at least one stiffness change is a material recess on an inner circumference of the tube portion of the sleeve.

11. The gap seal device of claim 9, wherein the stepped rod is integrally formed with the coupling.

12. The gap seal device of claim 9, wherein the stepped rod has a first end with an external thread and is screwed into an internal thread of the sleeve.

13. The gap seal device of claim 12, wherein the stepped rod has a second end with an external thread, which is screwed into an internal thread of the coupling.

* * * * *